(12) United States Patent
Hartmann

(10) Patent No.: US 7,788,912 B2
(45) Date of Patent: Sep. 7, 2010

(54) EXHAUST SYSTEM AND ASSOCIATED EXHAUST TREATMENT DEVICE

(75) Inventor: Sylvia Hartmann, Friedrichsthal (DE)

(73) Assignee: J. Eberspaecher GmbH & Co. KG, Esslingen (DE)

(*) Notice: Subject to any disclaimer, the term of this patent is extended or adjusted under 35 U.S.C. 154(b) by 90 days.

(21) Appl. No.: 11/406,053

(22) Filed: Apr. 18, 2006

(65) Prior Publication Data
US 2006/0233681 A1    Oct. 19, 2006

(30) Foreign Application Priority Data
Apr. 18, 2005    (DE) .................. 10 2005 017 946

(51) Int. Cl.
*F01N 3/00*    (2006.01)
(52) U.S. Cl. .................. 60/299; 60/297; 60/311
(58) Field of Classification Search .............. 60/322, 60/297, 299, 311; 422/179
See application file for complete search history.

(56) References Cited

U.S. PATENT DOCUMENTS

| | | | |
|---|---|---|---|
| 2,770,030 A * | 11/1956 | Carpenter et al. | 428/638 |
| 3,693,240 A * | 9/1972 | Jansson et al. | 228/131 |
| 4,004,887 A | 1/1977 | Stormont | |
| 4,525,620 A * | 6/1985 | Deverell et al. | 219/137 WM |
| 4,703,885 A * | 11/1987 | Lindgren et al. | 228/262.41 |
| 5,173,267 A | 12/1992 | Maus et al. | |
| 5,190,732 A * | 3/1993 | Maus et al. | 422/179 |
| 5,556,561 A * | 9/1996 | Ishikawa et al. | 219/137 WM |
| 6,334,981 B1 | 1/2002 | Wieres | |

FOREIGN PATENT DOCUMENTS

| | | |
|---|---|---|
| AU | 5093573 | 1/1973 |
| DE | 1190770 | 4/1965 |
| DE | 2301273 | 7/1973 |
| DE | 2412567 | 9/1974 |
| DE | 4445557 | 6/1996 |
| DE | 4445557 A1 | 6/1996 |
| DE | 19527634 A1 | 1/1997 |
| EP | 0435956 A1 | 7/1991 |
| EP | 0505720 | 9/1992 |
| WO | 90/04087 | 4/1990 |

OTHER PUBLICATIONS

European Search Report dated Feb. 7, 2007 for related Eurpean Application No. EP 06 11 1911.
International Search Report dated Oct. 27, 2005 for related German Application No. 10 2005 017 946.0.

* cited by examiner

*Primary Examiner*—Justine R Yu
*Assistant Examiner*—Diem Tran
(74) *Attorney, Agent, or Firm*—Howard IP Law Group, PC

(57) ABSTRACT

This invention relates to an exhaust treatment device for an exhaust system of an internal combustion engine, particularly in a motor vehicle. The device comprises a housing in which at least one exhaust treatment insert is arranged, and which is composed of at least two housing sections at least one of which consists of a ferritic material and at least another of which consists of an austenitic material. In order to increase the thermal resistance of the device at least one ferritic housing section is secured to at least one austenitic housing section by means of a connection, wherein this connection consists of a material whose coefficient of thermal expansion lies between the coefficients of thermal expansion of the ferritic material and of the austenitic material.

34 Claims, 2 Drawing Sheets

EXHAUST SYSTEM AND ASSOCIATED EXHAUST TREATMENT DEVICE

FIELD OF THE INVENTION

This invention relates generally to an exhaust system of an internal combustion engine, particularly in a motor vehicle, as well as an exhaust treatment device for such an exhaust system.

BACKGROUND OF THE INVENTION

Austenitic steels are normally used for manufacturing components of the exhaust system that are subjected to high thermal loads. Furthermore, it has been demonstrated in exhaust treatment devices where at least one exhaust treatment insert, particularly a catalytic converter element, is arranged in a housing, that it is advantageous for the mounting of the exhaust treatment insert, to manufacture the housing from a ferritic steel. Accordingly mixed ferritic-austenitic connections must necessarily be used inside an exhaust system that consists of ferritic components and austenitic components.

In modern internal combustion engines such as those that are used in motor vehicles in particular, increasing exhaust temperatures are being observed, which may result in failures due to thermal fatigue in the area of the mixed ferrite-austenitic connections mentioned. To avoid these thermally conditioned fatigue phenomena it is possible, in principle, to construct the area of the exhaust system at risk purely from ferrite or purely from austenite. A purely austenitic or purely ferritic construction of the thermally loaded areas of the exhaust system is not always possible, however, because ferritic materials have insufficient temperature resistance for many applications, for example. At the same time austenitic materials may be unsuitable for mounting an exhaust treatment insert, e.g. a catalytic converter.

One aspect of the present invention is concerned with the problem of proposing an improved design for an exhaust system or an exhaust treatment device of the type already mentioned in which, in particular, the risk of thermally conditioned fatigue phenomena is reduced, even though both austenitic and ferritic materials are used in construction.

SUMMARY OF THE INVENTION

According to an aspect of the invention, there is disclosed a method of securing an austenitic component or a ferritic component together by means of a connection inside the exhaust system or inside the exhaust treatment device, this connection comprising a material whose coefficient of thermal expansion has a value lying between the values of the coefficient of thermal expansion of the ferritic component and that of the austenitic component. The ferritic material is not therefore fixed directly to the austenitic material but fixing is carried out indirectly through the connection material which is fixed on the one hand to the ferritic material, and on the other hand to the austenitic material. However, since the coefficient of thermal expansion of the connection material lies somewhere between the coefficients of thermal expansion of the materials connected to it (austenite and ferrite), this produces an equalising effect which reduces stresses that are generated in the region of the connection. Consequently the risk of cracking due to the effects of thermal expansion in the region of the connection between the ferritic component and the austenitic component is reduced. This simultaneously also reduces the risk of failure of this connection. The thermal stability of the exhaust system or exhaust treatment device is therefore increased.

The connection material is preferably selected so that its coefficient of thermal expansion lies approximately midway between the coefficients of thermal expansion of the austenitic material and the ferrite material. This enables the equalising and stress reducing effect of the connection to be optimised.

The connection material should preferably be a two-phase material which has a ferrite phase and an austenitic phase. Such a two-phase material may also be referred to as a duplex material.

In a further aspect of the invention, the connection comprises a further component including of the connection material and secured on the one hand to the ferritic component and on the other hand to the austenitic component.

Additionally, or alternatively, the connection may constitute at least one welded seam of the connection material and fixed, in particular, to the ferritic component on the one hand and to the austenitic material on the other. For certain applications a sufficient reduction in stresses, resulting in the desired increase in thermal stability of the assembled component, can only be achieved by the use of a welded seam of the connection material.

It is understood that the characteristics mentioned above and yet to be explained below can be used not only in the combination indicated, but also in other combinations or in isolation without departing from the scope of this invention.

BRIEF DESCRIPTION OF THE DRAWINGS

Preferred embodiments of the invention are represented in the drawings and are explained in greater detail in the following description, the same references referring to identical or similar components or components with similar functions.

Figure 1:
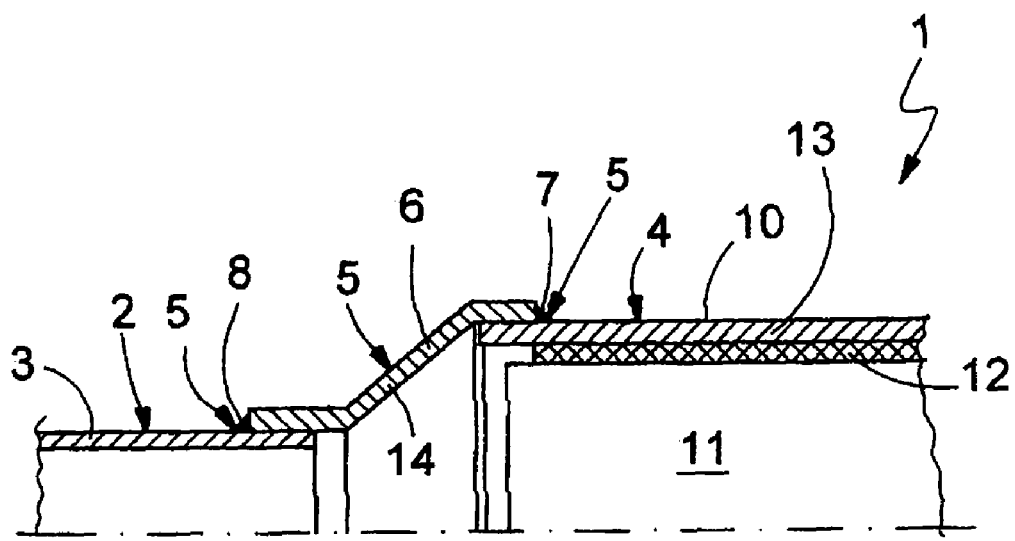
FIGS. 1 to 4 show, each diagrammatically.

a highly simplified, explanatory longitudinal section through an exhaust system or an exhaust treatment device in the region of a connection between an austenitic component and a ferritic component.

DETAILED DESCRIPTION OF THE PREFERRED EMBODIMENT OF THE INVENTION

According to FIGS. 1 to 4 an exhaust system 1 according to the invention comprises an exhaust line 2. Exhaust system 1 serves to discharge exhaust gases from an internal combustion engine, which may be installed in a motor vehicle in particular. Accordingly, exhaust line 2 serves to conduct exhaust gases.

Exhaust line 2 is composed of at least two components 3, 4. Both these components 3, 4 (constituents 3, 4) are secured together by means of a connection 5.

In exhaust system 1 according to an embodiment of the invention at least one of these components, e.g. the component denoted by 3, consists of an austenitic material, whilst at the same time at least one other of these components, here the component denoted by 4 for example, consists of a ferritic material. Now according to an aspect of the invention connection 5, by means of which the two components 3, 4 are secured together, is a material whose coefficient of thermal expansion lies between the coefficients of thermal expansion of the austenitic material of one component 3, and of the ferritic material of the other component 4.

In the embodiment shown in FIG. 1, the connection 5 comprises a further component 6, i.e. a further constituent 6.

The further component 6 consists of the connection material and is fastened on the one hand to the ferritic component 4 and on the other hand to the austenitic component 3. Here this fastening is carried out by means of welded seams 7 and 8 respectively.

Figure 2:
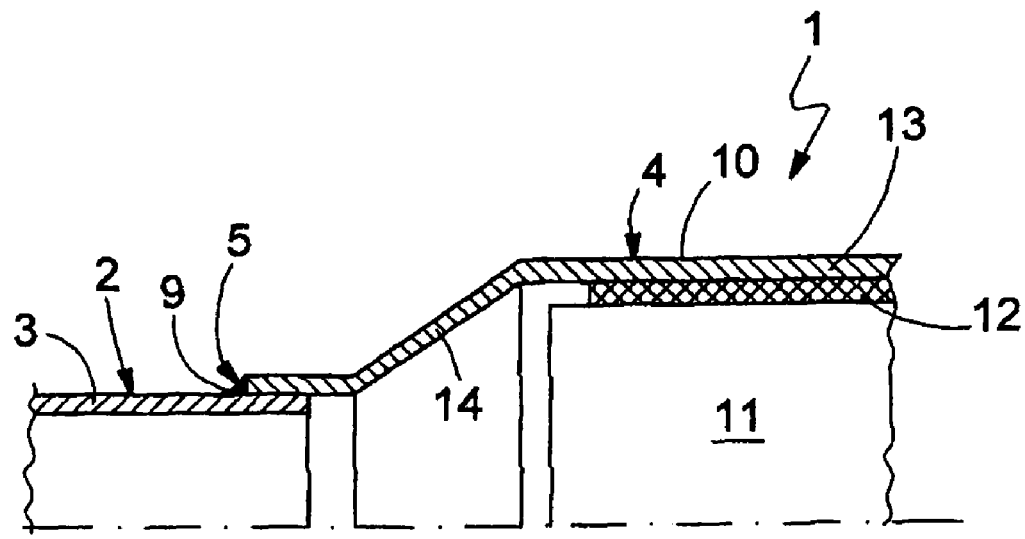

In the embodiment according to FIG. 2 the connection itself consists of a welded seam 9, which in turn consists of the connection material. Here welded seam 9 connects austenitic component 3 to ferritic component 4. Unlike the variant shown in FIG. 1, the additional component 6 may be omitted in the embodiment shown in FIG. 2.

Figure 3:
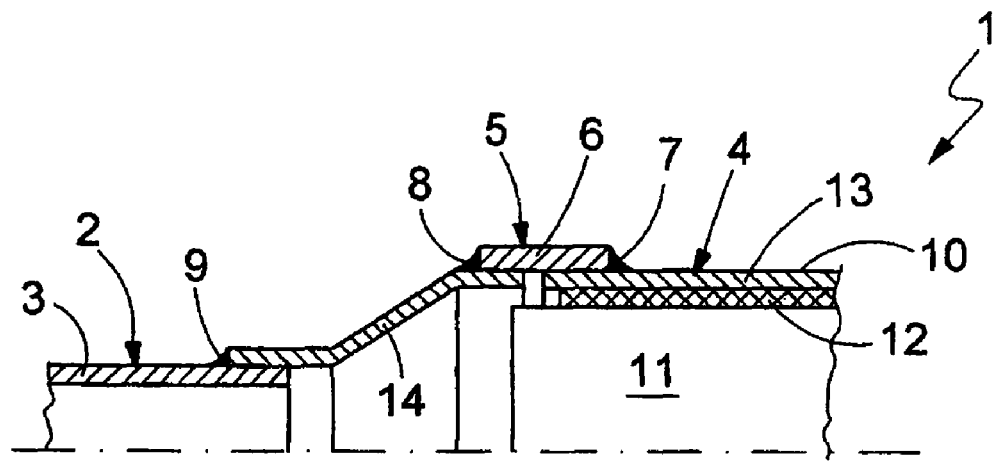
Figure 4:
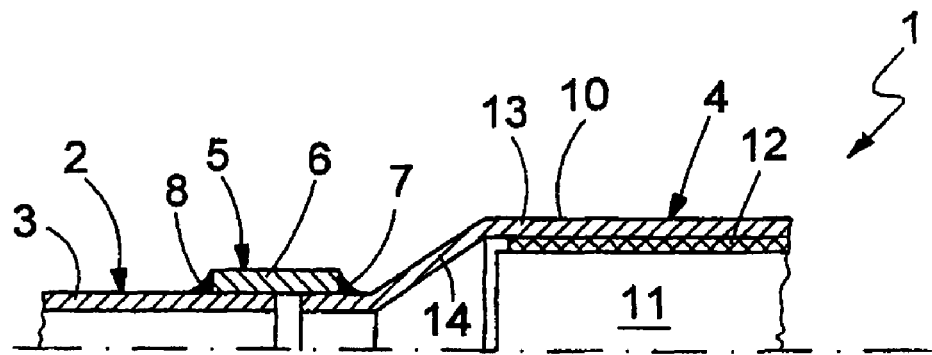

In the embodiments shown in FIGS. 3 and 4, connection 5 is—as shown in the variant according to FIG. 1—again fitted with the further component 6, which consists of the connection material.

The preferred embodiments shown here include, in the case of one of the components 3, an exhaust pipe which is also denoted in the following by 3. This exhaust pipe 3, which may preferably be an exhaust elbow pipe, i.e. forms the connection to the internal combustion engine of exhaust system 1, is preferably manufactured from austenitic material. Austenitic materials are characterised by a particularly high temperature resistance. The other component 4 is here preferably an exhaust treatment device which is also denoted in the following by 4. This exhaust treatment device 4 has a housing 10 in which at least one exhaust treatment insert 11 is arranged. For example, this exhaust treatment insert 11 is mounted in housing 10 by means of a supporting mat 12. This housing 10 suitably consists of a ferritic material, at least in a region adjacent to connection 5. A ferritic material may be advantageous for mounting exhaust treatment insert 11. The exhaust treatment insert 11 may preferably be a catalytic converter element, a particle filter element, a silencer element or a combination of at least two of the elements mentioned.

The further component 6 associated with connection 5 in exhaust system 1 according to the invention is preferably an annular body or sleeve body. In the embodiment shown in FIG. 1 the further component 6 is also designed in the shape of a funnel.

Whilst in the embodiments described above connection 5 according to the invention is used to fasten an austenitic component 3 to a ferritic component 4 of exhaust system 1, said connection 5 is used in the embodiments described above to fasten two components inside exhaust treatment device 4. For this purpose housing 10 of exhaust treatment device 4 is composed of at least two housing sections. For example, one of the housing sections in FIGS. 1 and 3 is a jacket 13, in which is arranged exhaust treatment insert 11, whilst the other housing section is an inlet funnel or outlet funnel, or generally a funnel 14.

In the embodiment described above with reference to FIG. 1, funnel 14 forms a component of exhaust system 1, namely the further component 6 of connection 5. Correspondingly funnel 14 then suitably consists of the connection material and is on the one hand secured by welded joint 8 to austenitic component 3, and on the other secured by welded joint 7 to ferritic component 4 or housing 10. However, if funnel 14 is regarded as a component of exhaust treatment device 4, it may be appropriate to manufacture funnel 14 from an austenitic material to allow a connection that is a stress-free as possible to austenitic exhaust pipe 3. In contrast to this, jacket 13 is preferably manufactured from a ferritic material, which may be advantageous for mounting exhaust treatment insert 11. In this constellation provision is made, according to the invention, to secure both housing sections 13, 14 together by means of connection 5 according to the invention. In the embodiment according to FIG. 1, this connection 5 is formed inside exhaust treatment device 4 by a welded seam, namely by welded seam 7. This welded seam 7 then consists of the connection material, whose coefficient of thermal expansion lies between the coefficients of thermal expansion of the austenitic material of funnel 14 used and the ferritic material of jacket 13 used.

In the embodiment shown in FIG. 3 connection 5 again comprises an additional component, here an additional housing section which is also denoted by 6. This further housing section 6 then consists of the connection material and is secured on the one hand to the ferritic housing section, here to jacket 13, and on the other to the austenitic housing section, here funnel 14. In this case the fastening is preferably again provided by welded seams 7 and 8 respectively. Funnel 14 may, when installed, be suitably secured by a welded joint 9, for example, to exhaust pipe 3 of exhaust system 1.

Furthermore, it is also embodied in the present invention to manufacture welded joints 7, 8, with which further housing section 6 of connection 5 is secured to the other housing sections 13, 14, from the connection material. It is also possible to use conventional ferritic welding materials for welded joint 7 between further component 6 and ferritic housing 13 on the one hand, and for an austenitic welded joint 8 between further housing section 6 and austenitic housing section 14 on the other hand. In another embodiment, welded joint 7 is formed between further housing section 6 and ferritic housing section 13 and which consists of a welding material whose coefficient of thermal expansion lies between the coefficients of thermal expansion of the connection material and the ferrite material. Accordingly the other welded joint 8 between further housing section 6 and austenitic housing section 14 may also consist of a welding material whose coefficient of thermal expansion lies between the coefficients of thermal expansion of the austenitic material and the connection material.

FIGS. 1 to 4 show different variants according to the design of connection 5 used, according to the material selected for welded seams 7, 8, 9 and for funnel 14, and according to whether funnel 14 is regarded as a housing section of exhaust treatment device 4 or as a component of exhaust system 1. FIGS. 2 and 4 show designs of exhaust system 1 in which austenitic component 3 (exhaust pipe) is connected to the other component 4 designed as exhaust treatment device 4, wherein its housing 10 is ferritic, at least in the region adjacent to connection 5. Accordingly, connection 5 is designed in FIG. 2 in the form of welded seam 5, which consists of said connection material.

In contrast to this connection 5, in the embodiment shown in FIG. 4, is fitted with additional component 6, which is on the one hand connected to austenitic component 3 and on the other to component 4, which is ferritic, at least in the region adjacent to connection 5. Here component 6 consists of connection material.

If funnel 14 is regarded as a component of exhaust treatment device 4, FIGS. 1 and 3 show designs of exhaust treatment device 4 according to the invention, in which two housing sections, namely jacket 13 and funnel 14, for example, are secured together by means of connection 5. In this case FIG. 1 shows connection 5 designed as welded seam 7. In contrast to this, FIG. 3 shows a design in which connection 5 has further housing section 6. Here funnel 14 is austenitic to allow a low stress connection to austenitic exhaust pipe 3.

In regard to FIG. 1, funnel 14 may also form a component of exhaust system 1. Here this component 14 may be ferritic, for example, and may be connected to austenitic exhaust pipe 3 by a welded seam 8, which is formed from the connection material and then constitutes connection 5. This constellation then corresponds to that also shown in FIG. 2, except that in the variant shown in FIG. 2 funnel 14 and jacket 13 are designed in one piece, whilst in the embodiment shown in FIG. 1 jacket 13 and funnel 14 form separate components which are secured together by welded seam 7.

Similarly, as explained above, funnel 14 may already be further component 6 of exhaust system 1, consisting of the connection material and associated with connection 5.

In the embodiments shown in FIGS. 1 and 3 funnel 14 may in principle also form an austenitic component of exhaust system 1, e.g. in the form of a widened end section of exhaust pipe 3. In particular, funnel 14 and exhaust pipe may, in contrast to the variant shown, also be manufactured in one piece. Here again connection 5 permits a stress-reduced fastening of this austenitic component 14 to the ferritic component of exhaust system 1 formed by exhaust treatment device 4 and its housing 10. Here again the fastening is provided by connection 5, which in the embodiment shown in FIG. 1 is formed by welded seam 7 consisting of the connection material and which, in the embodiment shown in FIG. 3, has additional component 6 consisting of the connection material.

A ferritic steel, e.g. a steel of grade 1.4509, 1.4510, 1.4512 or 1.4513, is particularly suitable as a ferritic material for the ferritic component of exhaust system 1, e.g. exhaust treatment device 4 or its housing 10, or for the ferritic housing section of exhaust treatment device 4, for example jacket 13. In this connection the material numbers refer to European standard EN 10027-2: 1992.

An austenitic steel, e.g. a steel of grade 1.4828, 1.4541, 1.4835, 1.4818, 1.4301 or 1.4841, is particularly suitable as an austenitic material for the austenitic component of exhaust system 1, e.g. exhaust pipe 3, or for the austenitic housing section of exhaust treatment device 4, e.g. funnel 14.

The connection material must be suitably selected, in terms of its coefficient of thermal expansion, so that the latter lies between the coefficients of thermal expansion of the ferritic material and the austenitic material. A two-phase material, which may also be referred to as a duplex material and has both a ferritic phase and an austenitic phase, is particularly suitable for the connection material. The connection material is preferably a two-phase steel, for example a steel of grade 1.4462, 1.4362, 1.4162, 1.4821 or 1.4501. For example, in exhaust treatment device 4 according to the invention, further housing section 6 associated with the connection is manufactured from this connection material. Similarly, in exhaust system 1 according to the invention, further component 6 associated with connection 5 may consist of this connection material.

If connection 5 is designed as welded seam 7, 8, 9, or incorporates such a welded seam 7, 8, 9, it consists of the connection material. Welded seam 7, 8, 9 according to the invention preferably consists of connection material that has a two-phase structure with an austenitic phase and a ferritic phase. For example, the desired two-phase material, e.g. said duplex material of grade 1.4462, 1.4362, 1.4820 or Avesta 2101, may be used as welding material or welding additive material to produce such a welded seam 7, 8, 9.

Alternatively it is also possible, in principle, to select the welding material or welding additive material so that it is only formed by the welding method, e.g. the desired two-phase or duplex material. For example, a ferritic welding material, e.g. of grade 1.4510 or 1.4511, may be used on an austenitic parent material for producing welded seam 7, 8, 9. This material forms the desired two-phase system with a ferritic phase and austenitic phase, whilst conforming to certain welding parameters during the welding process and age-hardening of welded seam 7, 8, 9.

Referring to FIGS. 1 and 2, a further alternative embodiment of the invention is explained in greater detail in the following. In this alternative solution housing 10 may consist of said connection material at least in a region in which at least one exhaust treatment insert 11 is arranged. For example, at least jacket 13 of housing 10 is therefore manufactured from the connection material in the embodiment shown in FIG. 1. In the embodiment shown in FIG. 2, in which jacket 13 comprises at least one funnel 14 as an integral component, both jacket 13 and at least one funnel 14 are manufactured from the connection material. As explained previously, this connection material is a material whose coefficient of thermal expansion lies between those of austenite and ferrite, preferably halfway between. A two-phase material, i.e. a duplex material, having both an austenitic phase and a ferritic phase, is suitably used for said area of housing 10, i.e. at least for jacket 13. The material used for jacket 13 of housing 10 is preferably a two-phase steel, particularly of grade 1.4462, 1.4362, 1.4162, 1.4821 or 1.4501.

The invention claimed is:

1. An exhaust treatment device for an exhaust system of an internal combustion engine, comprising:
   a housing having at least two housing sections, at least one of which includes a ferritic material and at least one other of which includes an austenitic material;
   at least one exhaust treatment insert arranged in the housing; and,
   means for connecting the at least one ferritic housing section to the at least one austenitic housing section, wherein the connection is composed of a duplex material with a ferritic phase and an austenitic phase,
   wherein, the connection has a single value of coefficient of thermal expansion from a first end where the connection connects to the at least one ferritic housing section to a second end where the connection connects to the at least one austenitic housing section, and
   wherein the coefficient of thermal expansion of the connection lies between the coefficients of thermal expansion of the ferritic material and the austenitic material.

2. The exhaust treatment device according to claim 1, wherein the connection comprises a further housing section composed of the connection material and which is secured to the ferritic housing section and the austenitic housing section.

3. The exhaust treatment device according to claim 1, wherein at least one of: the ferritic material is a ferritic steel and the austenitic material is an austenitic steel.

4. The exhaust treatment device according to claim 1, wherein the coefficient of thermal expansion of the connection material lies approximately halfway between the coefficients of thermal expansion of the ferritic material and the austenitic material.

5. The exhaust treatment device according to claim 1, wherein the connection material is a duplex steel.

6. The exhaust treatment device according to claim 1, wherein the connection material is a welding material or a welding additive material.

7. The exhaust treatment device according to claim 1, wherein the exhaust treatment insert comprises at least one of a catalytic converter element, a particle filter element and a silencer element.

8. The exhaust treatment device according to claim 1, wherein the connection comprises at least one welded seam.

9. The exhaust of claim 8, wherein the welded seam is composed of the connection material.

10. The exhaust treatment device according to claim 1, wherein one of the at least two housing sections is a jacket for receiving at least one exhaust treatment insert; and wherein at least one of: the jacket is ferritic; the other housing section is an inlet funnel or an outlet funnel; and the funnel is austenitic.

11. The exhaust treatment device according to claim 10, wherein the further housing section of the connection is an annular body or a sleeve body.

12. An exhaust system for an internal combustion engine, comprising:
an exhaust line conducting exhaust gas and comprising at least two components; and,
a connection fastening at least two of the components together;
wherein one of the components is composed of a ferritic material, at least in a region adjacent to the connection, and the other component is composed of an austenitic material, at least in a region adjacent to the connection; and,
wherein the connection is composed of a duplex material with a ferritic phase and an austenitic phase,
wherein, the connection has a single value of coefficient of thermal expansion from a first end where the connection connects to the ferritic component to a second end where the connection connects to the austenitic component, and
wherein the coefficient of thermal expansion of the connection lies between the coefficients of thermal expansion of the ferritic material and the austenitic material.

13. The exhaust system according to claim 12, wherein the connection comprises a further component composed of the connection material and secured to the ferritic component and the austenitic component.

14. The exhaust system according to claim 12, wherein the connection comprises at least one welded seam composed of the connection material.

15. The exhaust system according to claim 12, wherein one of the components is an exhaust pipe.

16. The exhaust system according to claim 12, wherein the connection comprises an annular body or a sleeve body.

17. The exhaust system according to claim 12, wherein the ferritic material is a ferritic steel of grade 1.4509, 1.4510, 1.4512 or 1.4513.

18. The exhaust system according to claim 13, wherein the austenitic material is an austenitic steel of grade 1.4828, 1.4541, 1.4835, 1.4818, 1.4841 or 1.4301.

19. The exhaust system according to claim 12, wherein the connection material coefficient of thermal expansion is approximately halfway between the coefficients of thermal expansion of the ferritic material and the austenitic material.

20. The exhaust system according to claim 13, wherein the connection material is a duplex steel of grade 1.4462, 1.4362, 1.4162, 1.4501 or 1.4821.

21. The exhaust system according to claim 12, wherein the connection material is a welding material or a welding additive material of grade 1.4511, 1,4510, 1.4462, 1.4362, 1.4820 or 1.4162.

22. The exhaust system according to claim 12, wherein one of the components is an exhaust treatment device having a housing for receiving an exhaust treatment insert.

23. The exhaust system according to claim 22, wherein the housing is ferritic, at least in a region adjacent to the connection, and the exhaust treatment insert includes at least one of a catalytic converter element, a particle filter element and a silencer element.

24. An application of a connection material in a connection inside an exhaust system of an internal combustion engine, or inside an exhaust treatment device for such an exhaust system for securing a first component of ferritic material to a second component of austenitic material,
wherein the connection material forms a duplex material with a ferritic phase and an austenitic phase,
wherein, the connection material has a single value of coefficient of thermal expansion from a first end where the connection material connects to the ferritic component to a second end where the connection material connects to the austenitic component, and
wherein the coefficient of thermal expansion of the connection material lies between the coefficients of thermal expansion of the ferritic material and the austenitic material.

25. The application according to claim 24, wherein the ferritic material is a ferritic steel of grade 1.409, 1.4510, 1.4512 or 1.4513.

26. The application according to claim 24, wherein the austenitic material is an austenitic steel of grade 1.4848, 1.4541, 1.4835, 1.4818, 1.4841 or 1.4301.

27. The application according to claim 24, wherein the coefficient of thermal expansion of the connection material lies approximately halfway between the coefficient of thermal expansion of the ferritic material and that of the austenitic material.

28. The application according to claim 24, wherein the connection material is a duplex steel of grade 1.4462, 1.4362, 1.4162, 1.4501 or 1.4821.

29. The application according to claim 24, wherein the connection material is a welding material or a welding additive material of grade 1.4511, 1.4510, 1.4462, 1.4362, 1.4820 or 1.4162.

30. An exhaust treatment device for an exhaust system of an internal combustion engine in a motor vehicle, comprising:
a housing;
at least one exhaust treatment insert arranged in the housing;
wherein the housing is composed of, at least in a region in which the at least one exhaust treatment insert is arranged, a duplex material with a ferritic phase and an austenitic phase, and
wherein, the duplex material has a single value of coefficient of thermal expansion lying between the coefficients of thermal expansion of a ferritic material and an austenitic material.

31. The exhaust treatment device according to claim 30, wherein the region of the housing in which the at least one exhaust treatment insert is arranged comprises a jacket of the housing.

32. The exhaust treatment device according to claim 30, wherein the region of the housing in which the at least one exhaust treatment insert is arranged comprises at least one of a jacket, an inlet funnel and an outlet jacket of the housing.

33. The exhaust treatment device according to claim 30, wherein the coefficient of thermal expansion of the region of the housing in which the at least one exhaust treatment insert is arranged lies approximately midway between the thermal coefficients of the ferritic material and austenitic material.

34. The exhaust treatment device according to claim 30, wherein the region of the housing in which the at least one exhaust treatment insert is arranged is formed of a duplex steel of grade 1.4462, 1.4362, 1.4162, 1.4821 or 1.4501.

* * * * *